US009764632B2

(12) United States Patent
Yu et al.

(10) Patent No.: US 9,764,632 B2
(45) Date of Patent: Sep. 19, 2017

(54) PLUG-IN HYBRID ELECTRIC VEHICLE BATTERY STATE OF CHARGE HOLD FUNCTION AND ENERGY MANAGEMENT

(75) Inventors: Hai Yu, Canton, MI (US); Ming Lang Kuang, Canton, MI (US); Ryan McGee, Ann Arbor, MI (US); Joseph G. Supina, Saline, MI (US); Johannes G. Kristinsson, Ann Arbor, MI (US); Fazal U. Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1541 days.

(21) Appl. No.: 12/986,632

(22) Filed: Jan. 7, 2011

(65) Prior Publication Data

US 2011/0166733 A1     Jul. 7, 2011

Related U.S. Application Data

(60) Provisional application No. 61/335,458, filed on Jan. 7, 2010.

(51) Int. Cl.
*B60W 20/00*     (2016.01)
*B60W 10/08*     (2006.01)
(Continued)

(52) U.S. Cl.
CPC .............. *B60K 6/445* (2013.01); *B60W 10/06* (2013.01); *B60W 10/08* (2013.01); *B60W 10/26* (2013.01); *B60W 50/082* (2013.01); *B60W 20/00* (2013.01); *B60W 2540/04* (2013.01); *B60W 2710/244* (2013.01); *Y02T 10/54* (2013.01); *Y02T 10/6239* (2013.01); *Y02T 10/6269* (2013.01); *Y02T 10/6286* (2013.01); *Y02T 90/14* (2013.01)

(58) Field of Classification Search
CPC ............ B60L 11/1861; B60L 15/2045; B60W 20/00; Y02T 10/7005; Y02T 10/7044; Y10S 903/903
USPC .................................................. 701/1, 36, 50
See application file for complete search history.

(56) References Cited

U.S. PATENT DOCUMENTS

| 5,487,002 A | 1/1996 | Diller et al. |
| 6,941,197 B1 | 9/2005 | Murakami et al. |

(Continued)

FOREIGN PATENT DOCUMENTS

| JP | 2006113892 A2 | 4/2006 |
| JP | 2007062640 A | 3/2007 |

(Continued)

*Primary Examiner* — Jerrah Edwards
*Assistant Examiner* — Charles J Han
(74) *Attorney, Agent, or Firm* — David B. Kelley; Brooks Kushman P.C.

(57) ABSTRACT

A plugin hybrid electric vehicle includes an internal combustion engine, a battery, an electric machine, and a controller. The vehicle is operable in a primary electric vehicle driving mode (EV mode) and in a hybrid electric vehicle driving mode (HEV mode). The controller is programmed to receive input from the driver representing a desired operating mode and a desired energy reservation. If the desired operating mode is HEV mode, then a state of charge (SOC) offset is established as the smaller of a maximum SOC offset and an allowable SOC offset, otherwise, the SOC offset is established based on the desired energy reservation. The vehicle is operated based on the SOC offset.

18 Claims, 7 Drawing Sheets

(51) Int. Cl.
  *B60W 10/26*  (2006.01)
  *B60W 10/06*  (2006.01)
  *B60K 6/445*  (2007.10)
  *B60W 50/08*  (2012.01)

(56) References Cited

U.S. PATENT DOCUMENTS

| | | |
|---|---|---|
| 2006/0278449 A1 | 12/2006 | Torre-Bueno |
| 2007/0029121 A1 | 2/2007 | Saitou et al. |
| 2008/0084186 A1 | 4/2008 | Elder et al. |
| 2008/0150490 A1 | 6/2008 | Koziara et al. |
| 2008/0275644 A1 | 11/2008 | Macneille et al. |
| 2009/0114463 A1 | 5/2009 | DeVault |
| 2009/0248228 A1 | 10/2009 | Miller |

FOREIGN PATENT DOCUMENTS

| | | |
|---|---|---|
| JP | 2010028913 A2 | 2/2010 |
| WO | WO 2006124130 A1 * | 11/2006 |
| WO | 2009042857 A2 | 4/2009 |
| WO | 2009042857 A3 | 4/2009 |
| WO | WO 2009042857 A2 * | 4/2009 |

\* cited by examiner

PLUG-IN HYBRID ELECTRIC VEHICLE BATTERY STATE OF CHARGE HOLD FUNCTION AND ENERGY MANAGEMENT

CROSS-REFERENCE TO RELATED APPLICATION

This application claims the benefit of U.S. provisional application No. 61/335,458, filed on Jan. 7, 2010, which is hereby incorporated by reference.

BACKGROUND

1. Technical Field

The invention relates to a plug-in hybrid electric vehicle battery state of charge hold function and energy management.

2. Background Art

Background information may be found in U.S. Pub. Nos. 20080275644 A1, 20060278449 A1, 20070029121 A1, 20080084186 A1, 20080150490 A1, 20090114463 A1; and JP2007062640A.

Further background information may be found in U.S. Pub. No. 20090248228 A1; WO2009042857A2; WO2009042857A3; U.S. Pat. No. 6,941,197; JP2010028913A2; U.S. Pat. No. 5,487,002; JP2006113892A2.

SUMMARY

In one embodiment, a method of controlling a plugin hybrid electric vehicle including an internal combustion engine, a battery, and an electric machine is provided. The vehicle is operable in a primary electric vehicle driving mode (EV mode) and in a hybrid electric vehicle driving mode (HEV mode). In primary EV mode, the vehicle is predominantly propelled by the electric machine, but the internal combustion engine may still momentarily run, depending on the situation; for example, if more drive power is desired than the electric machine provides, the internal combustion engine may run while the vehicle is in primary EV mode.

The method comprises receiving input from the driver representing a desired operating mode and a desired energy reservation. The method further comprises, if the desired operating mode is HEV mode, then establishing a state of charge (SOC) offset as the smaller of a maximum SOC offset and an allowable SOC offset, otherwise, establishing the SOC offset based on the desired energy reservation. The vehicle is operated based on the SOC offset.

The desired operating mode may be selected from a group including the EV mode, the HEV mode, and an automatic mode. The desired energy reservation may be an absolute energy amount. Or, the desired energy reservation may be a relative SOC level with respect to a minimum charge sustaining SOC.

The allowable SOC offset may be based on a minimum charge sustaining SOC and a present SOC when the driver requests HEV mode.

Establishing the SOC offset based on the desired energy reservation may be further based on a minimum charge sustaining SOC and a present SOC.

At the more detailed level, operating the vehicle based on the SOC offset may further comprise determining an energy management battery SOC as a present SOC less the SOC offset; and operating the vehicle based on the energy management battery SOC. The vehicle may be operated in battery charge depletion mode when the energy management battery SOC is greater than a minimum charge sustaining SOC. The vehicle may be operated in battery charge sustaining mode when the energy management battery SOC is not greater than a minimum charge sustaining SOC.

It is appreciated that embodiments of the invention comprehend may features. These features may be included individually and in various combinations, depending on the application.

In another embodiment, a plugin hybrid electric vehicle includes an internal combustion engine, a battery, an electric machine, and a controller. The vehicle is operable in a primary electric vehicle driving mode (EV mode) and in a hybrid electric vehicle driving mode (HEV mode). The controller is programmed to receive input from the driver representing a desired operating mode and a desired energy reservation.

If the desired operating mode is HEV mode, then a state of charge (SOC) offset is established as the smaller of a maximum SOC offset and an allowable SOC offset, otherwise, the SOC offset is established based on the desired energy reservation. The vehicle is operated based on the SOC offset.

In another embodiment, a hybrid electric vehicle operable in an electric mode and in a hybrid mode, comprises a controller programmed to receive input representing an operating mode and an energy reservation. The vehicle is operated based on an SOC offset. When the operating mode is the hybrid mode, the SOC offset is the smaller of a maximum SOC offset and an allowable SOC offset; otherwise, the SOC offset is based on the energy reservation.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Plug-in Hybrid Electric Vehicle (PHEV) is an extension of existing Hybrid Electric Vehicle (HEV) technology, in which an internal combustion engine is supplemented by an electric battery pack and at least one electric machine to further gain increased mileage and reduced vehicle emissions. A PHEV utilizes a larger capacity battery pack than a standard hybrid vehicle, and it adds the capability to recharge the battery from a standard electrical outlet to decrease fuel consumption and to further improve the vehicle's fuel economy in an electric driving mode or in a hydrocarbon/electric blended driving mode.

Conventional HEVs buffer fuel energy and recover kinematic energy in electric form to improve the overall vehicle system operating efficiency. Hydrocarbon fuel is the principal energy source. For PHEVs, there is one additional source of energy—the amount of electric energy stored in the battery from the grid after each battery charge event.

A power management strategy for PHEVs will have the opportunity to allocate a driver power demand to the two energy sources to achieve improved fuel economy and other comparable HEVs' control objectives.

While the most conventional HEVs are operated to maintain the battery state of charge (SOC) around a constant level, PHEVs desire to use as much pre-saved battery electric (grid) energy as possible before the next battery charge event; i.e. the relatively low cost grid supplied electric energy is expected to be fully utilized for propulsion and other vehicle functions after each charge. After the battery SOC decreases to a low conservative level, the PHEV will resume operation as a conventional HEV in a so-called charge sustaining mode.

Figure 3:
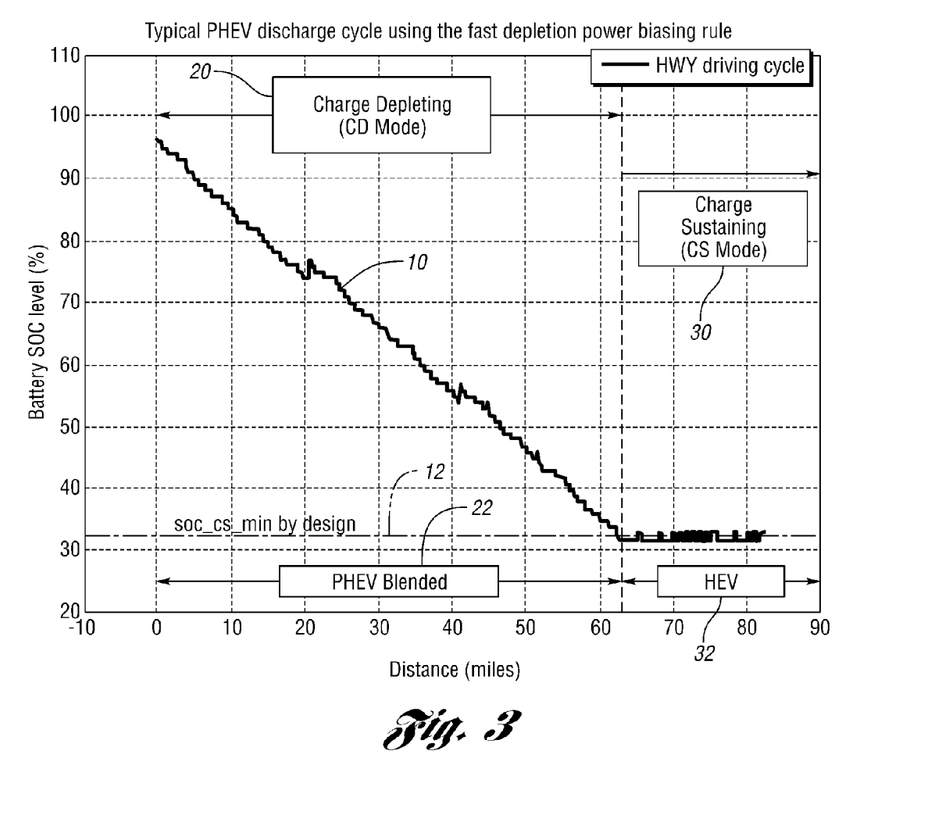
FIG. 3 is a plot of a typical PHEV discharge cycle for a charge depletion strategy.

FIG. 3 shows the two basic operation modes of a PHEV: charge depleting (CD) and charge sustaining (CS) mode. During a first travel distance after a charge, the fully/partially charged PHEV is driven in CD mode, where primarily the battery electric energy is used to propel the vehicle, gradually depleting the battery's electric energy. Once the battery SOC decreases to a predefined charge sustaining SOC level, the vehicle switches to CS mode, where the battery SOC is kept within a certain range around the charge sustaining SOC level and the vehicle is mainly powered, for example, by a gasoline engine (fuel energy), as is done in a conventional HEV. The CD range is defined as the distance a fully charged PHEV can travel in CD mode before the energy utilization pattern switches to the CS mode. By primarily using the battery electric energy to propel the vehicle, the PHEV fuel consumption will be minimized (blended CD mode) or even with no gasoline fuel cost at all (all-electric CD mode), especially when the trip distance is less than or close to the CD range (~30-60 miles in a typical design in multiple driving cycles). This control strategy is called base PHEV charge depletion strategy.

The total electric energy from the grid is supplied for propulsion only. In some applications, a driver would like to save a certain amount of battery electric power for utility purposes other than for driving power. For example, an amount of electric power, supplied from the vehicle's batteries, can be used for entertainment in recreational camping areas, for lighting or for outdoor power tools. It is preferable to save this amount of energy in advance rather than generating the electric power on-site. The invention provides a simple solution to provide the PHEV driver with an ability to pre-save battery electric energy by inputting a certain percentage of battery depth of discharge (DOD) level to hold (DOD hold), or equivalently an amount of energy using a general human/machine interface (HMI).

With continuing reference to FIG. 3, typical PHEV discharge cycle using the fast depletion power biasing rule is shown. The x-axis indicates distance (miles); the y-axis indicates battery SOC level (%). A plot of battery SOC level is indicated at 10. The minimum, by design, state of charge level is indicated at 12. Charge depleting (CD mode) operation is depicted at 20, and PHEV blended operation is indicated at 22. Charge sustaining (CS mode) operation is depicted at 30, and HEV operation is indicated at 32. Charge depleting (CD) and charge sustaining (CS) modes are battery modes; PHEV blended (and primary electric) and HEV are powertrain operating modes. That is, in PHEV blended or primary electric powertrain operating mode, the battery mode may be CD mode or CS mode as appropriate. As well, in HEV powertrain operating mode, the battery mode may be CD mode or CS mode as appropriate.

Figure 1:
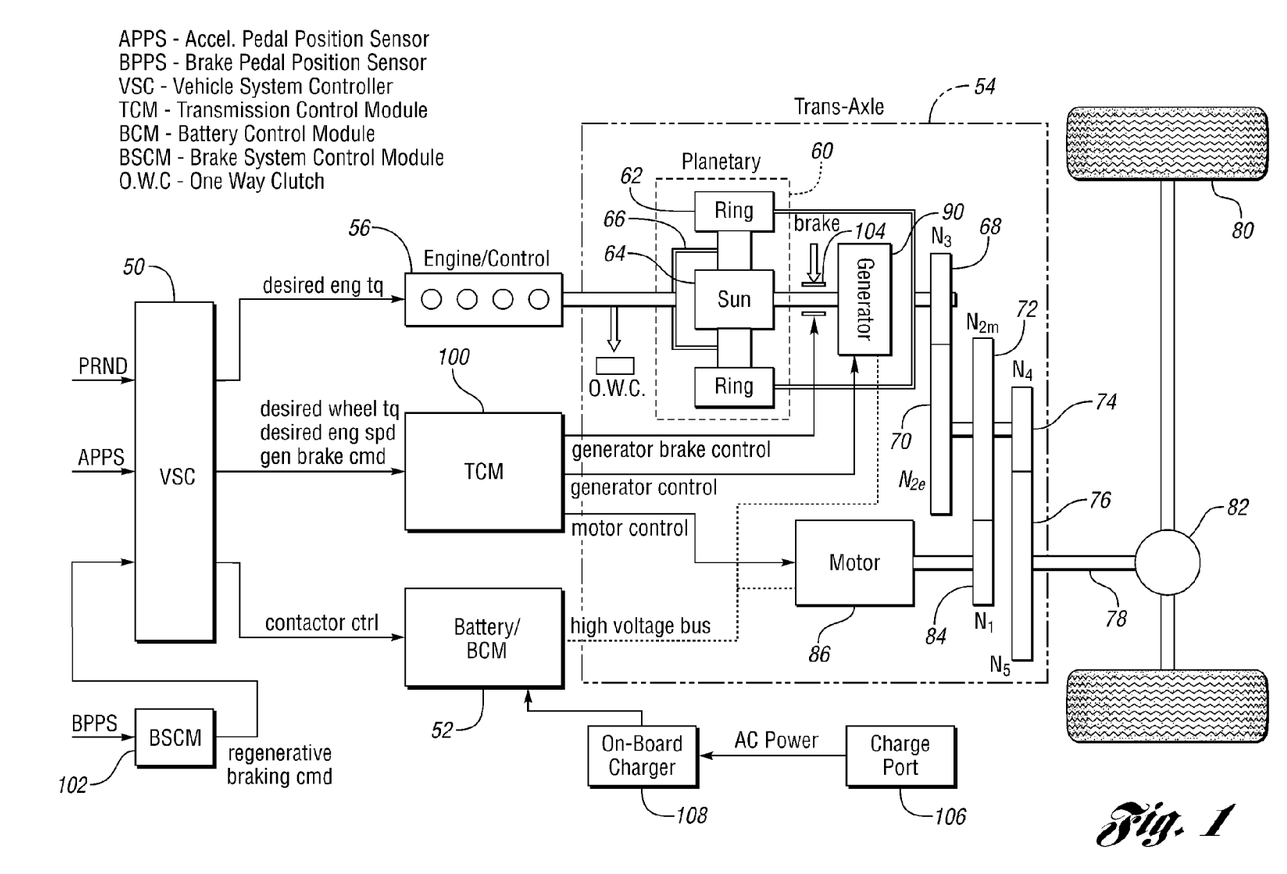
FIG. 1 is a schematic representation of a hybrid electric vehicle powertrain capable of embodying the invention.
Figure 2:
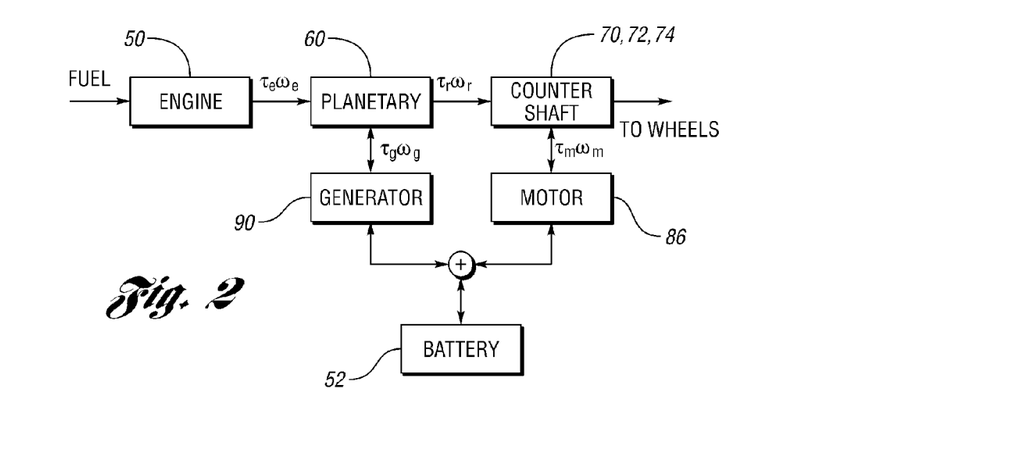
FIG. 2 is a diagram of the power flow paths for the components of the powertrain shown in FIG. 1.

The power split hybrid electric vehicle (HEV) is a parallel hybrid electric vehicle. FIG. 1 shows the power split HEV powertrain configuration and control system. In this powertrain configuration, there are two power sources that are connected to the driveline: 1) a combination of engine and generator subsystems using a planetary gear set to connect to each other, and 2) the electric drive system (motor, generator, and battery subsystems). The battery subsystem is an energy storage system for the generator and the motor. FIG. 2 shows the possible power flow paths in this powertrain configuration.

In the first power source, as shown in FIG. 2, the engine output power can be split into two paths by controlling a generator-mechanical path $t_r\omega_r$ (from the engine to the carrier to the ring gear to counter shaft), and an electrical path $\tau_g\omega_g$ to $\tau_m\omega_m$ (from the engine to the generator to the motor to the counter shaft). The way to split the engine power is to control the engine speed to a desired value, which results in a definite generator speed for a given ring gear speed, (or vehicle speed), because of the kinematic property of a planetary gear set.

The generator speed will change according to the vehicle speed for a definite desired engine speed, and the engine speed can be decoupled from the vehicle speed. The changing generator speed will vary the engine output power split between an electrical path and a mechanical path. In addition, the control of engine speed results in a generator torque to react against the engine output torque. It is this generator reaction torque that conveys the engine output torque to the ring gear of the planetary gear set, and eventually to the wheels. This mode of operation is called "positive split". It is noted that because of the mentioned kinematic property of the planetary gear set, the generator can possibly rotate in the same direction of its torque that reacts against the engine output torque. In this operation, the generator inputs power (like the engine) to the planetary gear set to drive the vehicle. This operation mode is called "negative split".

As in the case of the positive split mode, the generator torque resulting from the generator speed control during a negative split reacts to the engine output torque and conveys the engine output torque to the wheels. This combination of the generator, the motor and the planetary gear set is analogous to an electro-mechanical CVT. When the generator brake (shown in FIG. 1) is actuated (parallel mode operation), the sun gear is locked from rotating and the generator braking torque provides the reaction torque to the engine output torque. In this mode of operation, all the engine output power is transmitted, with a fix gear ratio, to the drivetrain through the mechanical path.

In a power split powertrain system, unlike conventional vehicles, the engine requires either the generator torque resulting from engine speed control or the generator brake torque to transmit its output power through both the electrical and mechanical paths (split modes) or through the all-mechanical path (parallel mode) to the drivetrain for forward motion.

In the second power source, the electric motor draws power from the battery and provides propulsion independently from the engine to the vehicle for forward and reverse motions. This operating mode is called "electric drive". In addition, the generator can draw power from the battery and drive against a one-way clutch coupling on the engine output shaft to propel the vehicle forward. The generator can propel the vehicle forward alone when necessary. This mode of operation is called generator drive mode.

The operation of this power split powertrain system, unlike conventional powertrain systems integrates the two power sources to work together seamlessly to meet the driver's demand without exceeding the system's limits (such as battery limits) while optimizing the total powertrain system efficiency and performance. Coordination control between the two power sources is needed. As shown in FIG. 1, there is a hierarchical vehicle system controller (VSC) that performs the coordination control in this power split powertrain system. Under normal powertrain conditions (no subsystems/components faulted), the VSC interprets the driver's demands (e.g. PRND and acceleration or deceleration demand), and then determines the wheel torque command based on the driver demand and powertrain limits. In addition, the VSC determines when and how much torque each power source needs to provide in order to meet the driver's torque demand and achieve the operating point (torque and speed) of the engine.

With continuing reference to FIG. 1, a vehicle system controller (VSC) 50, a battery and battery energy control module (BCM) 52, and a transmission 54 are shown. An internal combustion engine 56 distributes torque to transmission 54. The transmission 54 includes a planetary gear unit 60, which comprises a ring gear 62, a sun gear 64, and a planetary carrier assembly 66. The ring gear 62 distributes torque to step ratio gears comprising meshing gear elements 68, 70, 72, 74, and 76. A torque output shaft 78 for the transmission 54 is drivably connected to vehicle traction wheels 80 through a differential and axle mechanism 82.

Gears 70, 72, and 74 are mounted on a countershaft, with gear 72 engaging a motor-driven gear 84. Electric motor 86 drives gear 84, which acts as a torque input for the countershaft gearing.

The battery delivers electric power to the motor. Generator 90 is connected electrically to the battery and to the motor 86 in a known fashion.

Also shown in FIG. 1 are a transmission control module (TCM) 100 and a brake system control module (BSCM) 102. TCM 100 provides generator brake control to generator brake 104, provides generator control to generator 90, and provides motor control to motor 86. BSCM 102 provides a regenerative braking command to VSC 50. VSC 50 also receives acceleration pedal position sensor (APPS) input, and park-reverse-neutral-drive (PRND) input. VSC 50 provides outputs for; desired engine torque to engine/control 56; desired wheel torque, desired engine speed, and generator brake command to TCM 100; and contactor control to battery/BCM 52.

The power flow paths between the various elements of the powersplit powertrain diagram shown in FIG. 1 are illustrated in FIG. 2. Fueling is scheduled based on driver and other inputs. Engine 56 delivers power to the planetary gear unit 60. The available engine brake power is reduced by accessory loads. Power is delivered by the planetary ring gear to the countershaft gears 70, 72, 74. Power output from the transmission drives the wheels.

Also shown in FIG. 1, battery 52 periodically receives AC electrical energy from the grid via a charge port 106 connected to the grid. An on-board charger 108 receives the AC electrical energy from charge port 106. Charger 108 is an AC/DC converter which converts the received AC electrical energy into DC electrical energy suitable for charging battery 52. In turn, charger 108 supplies the DC electrical energy to battery 52 in order to charge battery 52 during the recharging operation.

The driver has the possibility to reserve a portion of the electrical energy charged from the grid by entering an amount of electric energy for reservation. At the end of the trip, the PHEV will work around a SOC level that corresponds to the amount the electric energy reserved by the driver beyond the calibrated charge sustaining SOC level. (See FIG. 4).

Put another way, the actual SOC hold level is determined as a sum of a driver requested energy reservation and the calibrated charge sustaining SOC level. For example, if the driver selects pre-saved electric energy equivalent to 30% of battery full charge energy, the driver requested energy reservation is equal to 30%. The minimum charge sustaining battery SOC level (SOC_hold) will be equal to 65% since the default charge sustaining SOC level (soc_cs_min) is 35%.

To verify the battery hold concept, a variable battery power biasing rule can be used to extend the PHEV charge depleting process to the whole trip. Given an estimated trip distance of 95 miles after a battery full charge, the driver may reserve battery SOC level at 60% for utility purpose.

According to the base PHEV charge depletion strategy, as previously indicated, the PHEV will primarily use the battery electric energy to power the vehicle until the battery SOC is depleted to the charge sustaining level. After this the PHEV will resume HEV operation mode while maintaining the battery SOC around the CS level. When the PHEV is in CD operation, the vehicle emission is minimized as the vehicle is mainly driving in Electric Vehicle (EV) mode or blended EV mode. On the other hand, both the vehicle emission and noise will be much higher when the PHEV is in CS operation as the engine is mostly on and the fuel energy is the primary energy source (i.e., the engine).

Often, the driver may know the trip route and environment in advance. If the battery electric energy usage could be planned to a certain extent, the operation of the PHEV along the trip would be both more energy efficient and environmental-friendly. For example, during a certain trip several sections along the trip route will be in highly populated urban areas, and the driver may plan to drive the PHEV mainly in EV mode within these sections to minimize vehicle emission and noise. This use case can be called City-Friendly PHEV operation mode.

In another example, the driver may plan to use a large amount of vehicle electric energy at a certain spot during the trip for utility or entertainment purposes. Instead of generating electric energy by the PHEV by converting fuel energy, the driver may wish to reserve in advance an amount of battery electric energy from being used for vehicle propulsion such that his/her work can be done quietly, energy efficiently and with no emission. In order to achieve these goals the PHEV energy management control strategy has to be designed to be flexible to allow the driver the ability to switch back and forward from the EV operation mode (battery charge depleting) to the HEV operation mode (battery charge sustaining) as well as to an operation mode in which a default controlled battery charge depletion rate can be achieved. Further, the energy management control strategy will also enable the driver to hold the battery SOC (conservation) at an arbitrary level with a given battery operation SOC range.

Figure 4:
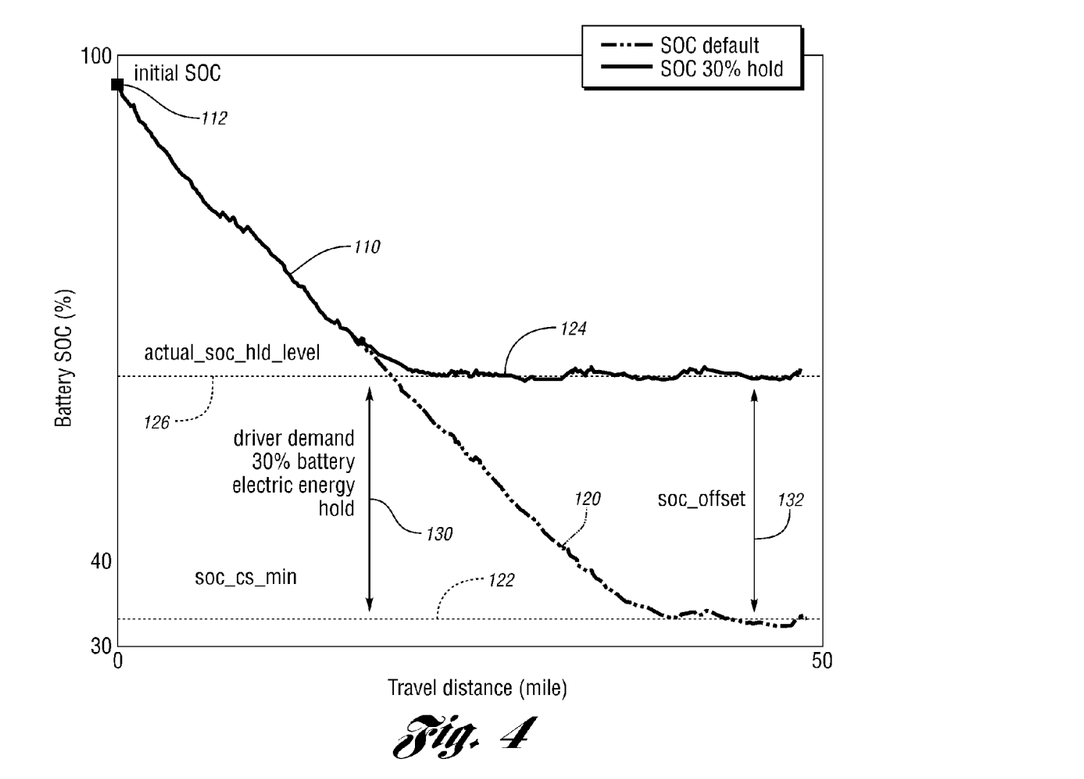
FIG. 4 is a plot of battery SOC vs. travel distance for a PHEV using a strategy of the present invention.

With continuing reference to FIG. 4, examples are described in further detail. In FIG. 4, battery SOC (%) versus travel distance (miles) is illustrated. The figure illustrates the base PHEV charge depletion strategy (SOC default) compared to a case where the driver has reserved 30% of the battery (SOC 30% hold). Specifically, at 110, the system operates in CD mode and 110 indicates both SOC default and SOC 30% hold. The initial SOC, SOC(0), is indicated at 112. When the strategy is SOC default, the system continues to operate in CD mode as indicated at 120 until default charge sustaining level 122 is reached. On the other hand, when the strategy is SOC 30% hold, the system changes to CS mode sooner as indicated at 124 to hold SOC at new charge sustaining level 126. The battery SOC difference between new charge sustaining level 126 and default charge sustaining level 122 represents the driver demand of 30% battery electric energy hold, 130. Battery SOC reserved 132 also illustrates the energy hold.

The PHEV energy management function of the invention enables flexible usage of the PHEV battery electric energy with driver's input commands in PHEV operation mode (EV vs. HEV) and during battery energy reservation (battery SOC hold). This is divided into two sub-functions:

(a) EV/HEV switch sub-function;
(b) SOC hold sub-function.

The two sub-functions are not mutually exclusive to each other. The driver is able to make two decisions:

(i) Operating Mode Preference—Whether the vehicle shall be operated in EV mode (battery charge depletion), HEV mode (battery charge sustaining) or automatic mode (automatically managed by the base PHEV strategy). These operating modes are mutually exclusive.

(ii) Energy Reservation—Whether a specific amount of electric energy shall be reserved for non-propulsion usage and when this energy shall be released.

Both the operating mode preference and the energy reservation decisions are only preferred choices and not actual commands. The proposed PHEV charge depletion strategy is active only when the choices can be followed.

Figures 5, 6:
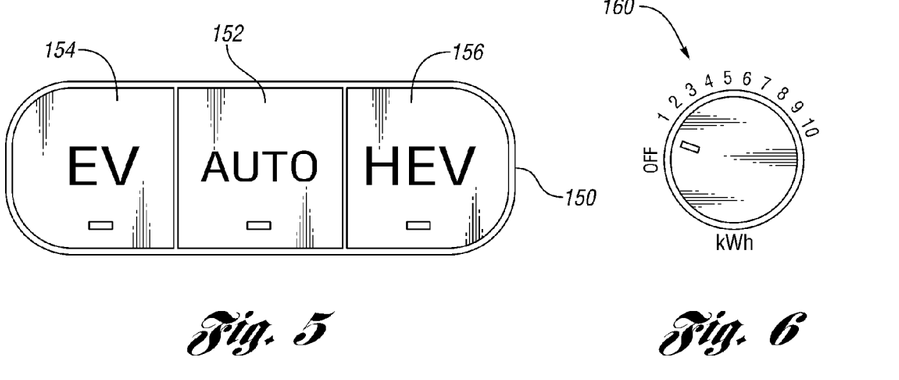
FIG. 5 is an illustration of a typical dash-mounted mode selector switch.
FIG. 6 is an illustration of a driver-controlled energy reservation control knob.

Given the concept of the function, the expected control input from the driver are (see FIG. 5):

1. Operating Mode Preference Function enable/disable flag. The default is automatic mode, which indicates that the energy management is fully controlled by the internal PHEV energy management controller.

2. EV/HEV mode switch. EV will correspond to battery charge depletion operation when the battery SOC level is higher than the designed battery charge sustaining level. HEV mode has the battery charge sustaining at current SOC level when the battery SOC is within an allowable battery charge sustaining range. Outside these ranges the base PHEV charge depletion strategy is used by the internal energy management controller.

3. The desired battery energy reservation level (a certain amount of electric energy or battery SOC) and hold/release command (see FIG. 6). When a certain amount of battery energy is desired to be reserved, a battery SOC hold level will be determined and the vehicle will start CS operation once the battery SOC level is depleted to that level. If the desired SOC hold level is higher than the current battery SOC level, the desired SOC level changes to the current SOC level. When the battery energy hold function is released, i.e. the desired battery SOC hold level is reset/cleared and the PHEV operation will resume normal CD or CS operation mode based on current battery SOC state.

The driver's desirable battery electric energy hold can be in the format of a certain amount of energy in kWh or a certain amount of battery SOC. The amount of battery SOC at hold can be an absolute battery SOC level (i.e. the SOC level at which the driver commanded to do charge sustaining), or it can be a relative battery SOC level (i.e. a partial amount of SOC of the available SOC, which is the current SOC minus the charge sustaining SOC level).

In FIG. 5, a mode selector switch 150 allows the driver to select an operating mode preference. Selection 152 is automatic mode; selection 154 is EV mode; and selection 156 is HEV mode.

In FIG. 6, an energy reservation control knob 160 allows the driver to select a certain amount of battery energy for reserve.

Figure 7:
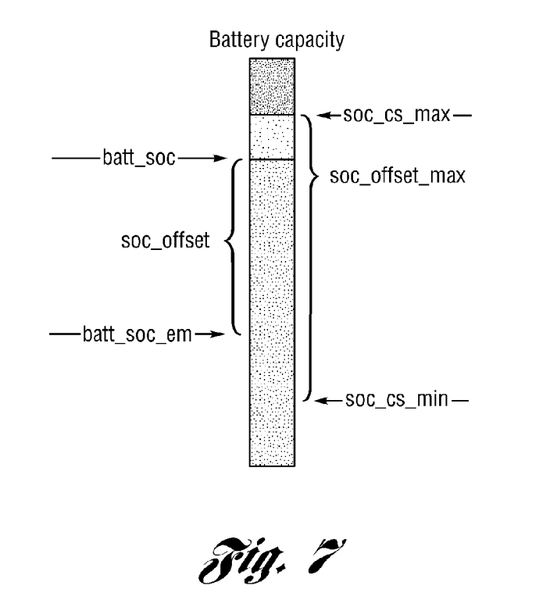
FIG. 7 is a graph showing battery SOC levels.

The suggested flexible PHEV energy management strategy is based on a SOC offset variable soc_offset (see FIG. 7). This variable, once set, will adjust the original battery SOC variable used for energy management, engine stop/start and other vehicle control functions such that the battery SOC used in the control algorithm (batt_soc_em) will be:

$$batt\_soc\_em = batt\_soc - soc\_offset, \quad (1)$$

where batt_soc is the true current battery SOC. The calculated batt_soc_em is illustrated in FIG. 7.

The soc_offset variable is used by both the energy reservation and the operating mode preference sub-functions. The goal in both cases is to trick the energy management system to believe that the current battery SOC is lower than it is. Since the internal energy management control will assure that the SOC exceeds the vicinity below the soc_cs_min value, the vehicle will automatically go into CS mode preserving the available battery energy at a fixed level (above the real soc_cs_min).

In case of the energy reservation sub-function, soc_offset is set to represent the desired electric energy reservation level. In case of the operating mode preference sub-function, if the HEV/EV switch is set to HEV, soc_offset is set to reserve all the available battery forcing CS mode independent of the true batt_soc.

The total amount of battery available for the soc_offset is always limited by the soc_cs_min and soc_cs_max.

$$soc\_offset\_max = soc\_cs\_max - soc\_cs\_min \quad (2)$$

Besides, the allowable battery reservation range is limited by the current SOC state $$soc\_offset\_alw = batt\_soc - soc\_cs\_min \quad (3)$$

For battery protection and regenerative energy capability, the PHEV will not start operation in CS mode when the true current battery SOC is higher than the maximal allowable battery charge sustaining SOC level, soc_cs_max. By always upper limiting the soc_offset by the soc_offset_max, this will be achieved.

Because of this limitation, even if the driver selects the HEV mode of the operating mode preference sub-function, the vehicle will operate in CD mode until the battery SOC, batt_soc, reaches soc_cs_max. Also, the EV mode is no longer available when the batt_soc is reduced to soc_cs_min. The operating mode preference selector then will automatically switch to "auto" and will not be able to be changed again when this level is reached. The PHEV then will only be running in CS mode to keep the batt_soc in a vicinity around soc_cs_min.

The driver's desired battery electric energy reservation amount, soc_offset_hld_desired, is an offset independent of the present SOC. If no energy reservation is set, this variable is 0. If a certain amount of energy is reserved this amount is converted into a range of SOC. The driver can never request more energy than is either currently available, or the maximum energy available for the SOC offset, soc_offset_max. The actual battery reservation offset is therefore represented by the variable soc_offset_hld.

$$\text{soc\_offset\_hld} = \min(\text{soc\_offset\_hld\_desired}, \text{soc\_offset\_alw}, \text{soc\_offset\_max}) \quad (4)$$

The calculation of soc_offset is dependent on the combination of the operating mode preference and energy reservation sub-function.

If HEV mode is enabled, the soc_offset is always set to reserve all the available battery energy, which implicitly forces the vehicle into Charge Sustaining mode regardless of the energy reservation state. If either EV or automatic mode is enabled, the soc_offset will be set to represent the desired electric energy reservation level. Equation 5 explains the calculation and Table 1 defines when which of the equations is to be used.

TABLE 1 soc_offset calculation selection

|  |  | operating mode preference | |
| --- | --- | --- | --- |
|  |  | EV* | automatic | HEV |
| energy reservation | on | 5b | 5b | 5a |
|  | off | 5c | 5c | 5a |

$$\text{soc\_offset} = \begin{cases} \min\left(\dfrac{\text{batt\_soc} - \text{soc\_cs\_min}}{\text{soc\_offset\_max}}\right) & [\text{if } HEV \text{ mode is activated}] & (5a) \\ \text{soc\_offset\_hld} & [\text{else if energy reservation is activated}] & (5b) \\ 0 & [\text{else}] & (5c) \end{cases}$$

The conditions for selecting soc_offset calculation is constantly re-evaluated and the actual calculations performed continuously. The control logic for battery SOC offset calculation and operating mode determination are summarized as in the logic flowchart in FIG. 8. A corresponding logic flowchart for a system that does not include a mode preference switch is presented in FIG. 9.

Figure 8:
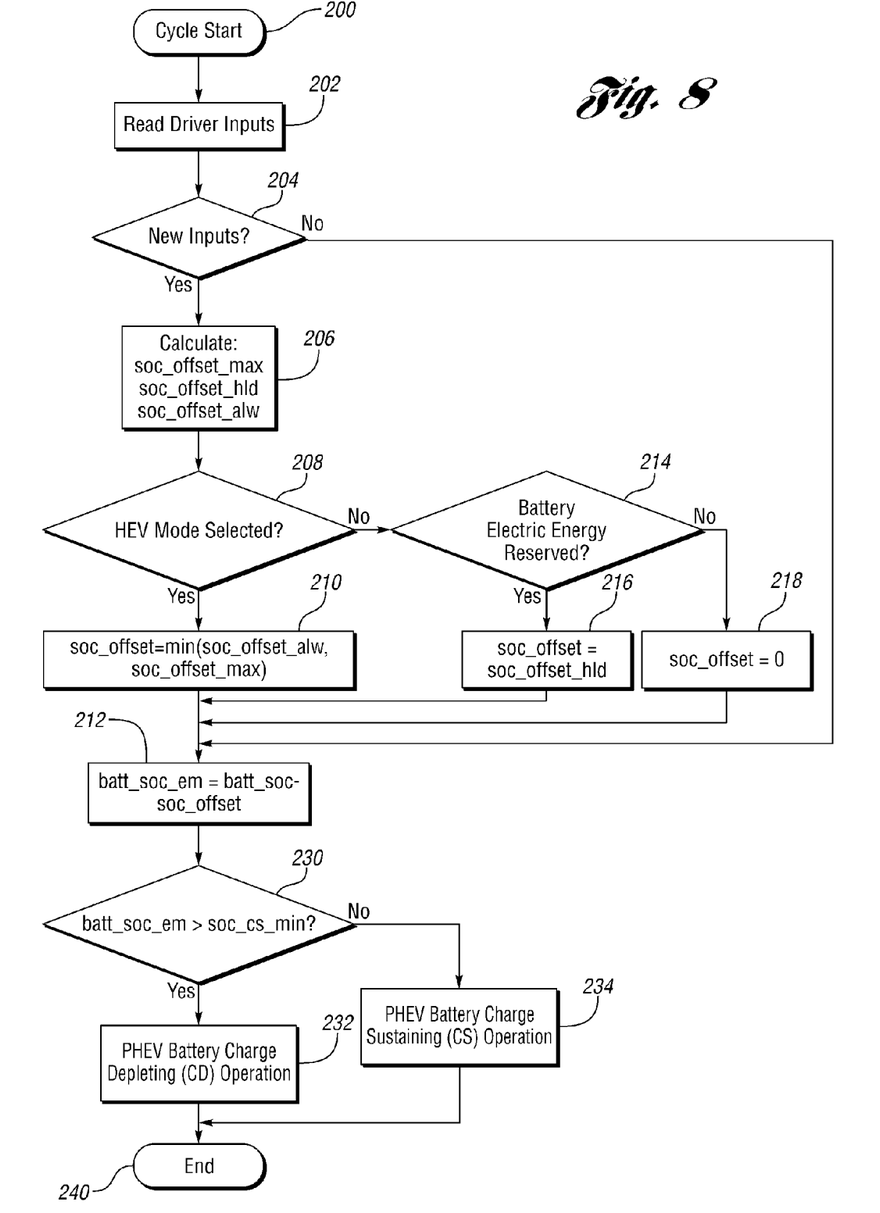
FIG. 8 is a flowchart of the control strategy of the invention when a HEV mode switch is included.

In more detail, in FIG. 8, processing starts at block 200. At block 202, driver inputs are read. At block 204, a check for new inputs is made. If there are new inputs, at block 206, soc_offset_max, soc_offset_hld, and soc_offset_alw are calculated. At block 208, if HEV mode is selected, flow proceeds to block 210; if HEV mode is not selected, flow proceeds to block 214. At block 210, soc_offset is calculated so that soc_offset occupies all available, allowed energy. This will have as a result that the vehicle needs to operate in HEV/CS mode since no energy is available for propulsion. At block 214, if there is a battery electric energy reservation, the flow proceeds to block 216 where soc_offset is set to the requested reservation limit—soc_offset_hld. If there is not a battery electric energy reservation, soc_offset is set to 0 at block 218.

At block 212, batt_soc_em is set. By making the Energy Management use this modified value instead of the normal batt_soc, it will achieve the intended effects of the drivers input. At block 230, batt_soc_em is compared to soc_cs_min. When batt_soc_em is greater than soc_cs_min, PHEV battery charge depleting operation takes place (CD mode) at block 232. When batt_soc_em is not greater than soc_cs_min, PHEV battery charge sustaining operation takes place (CS mode) at block 234. Flow ends at block 240.

Figure 9:
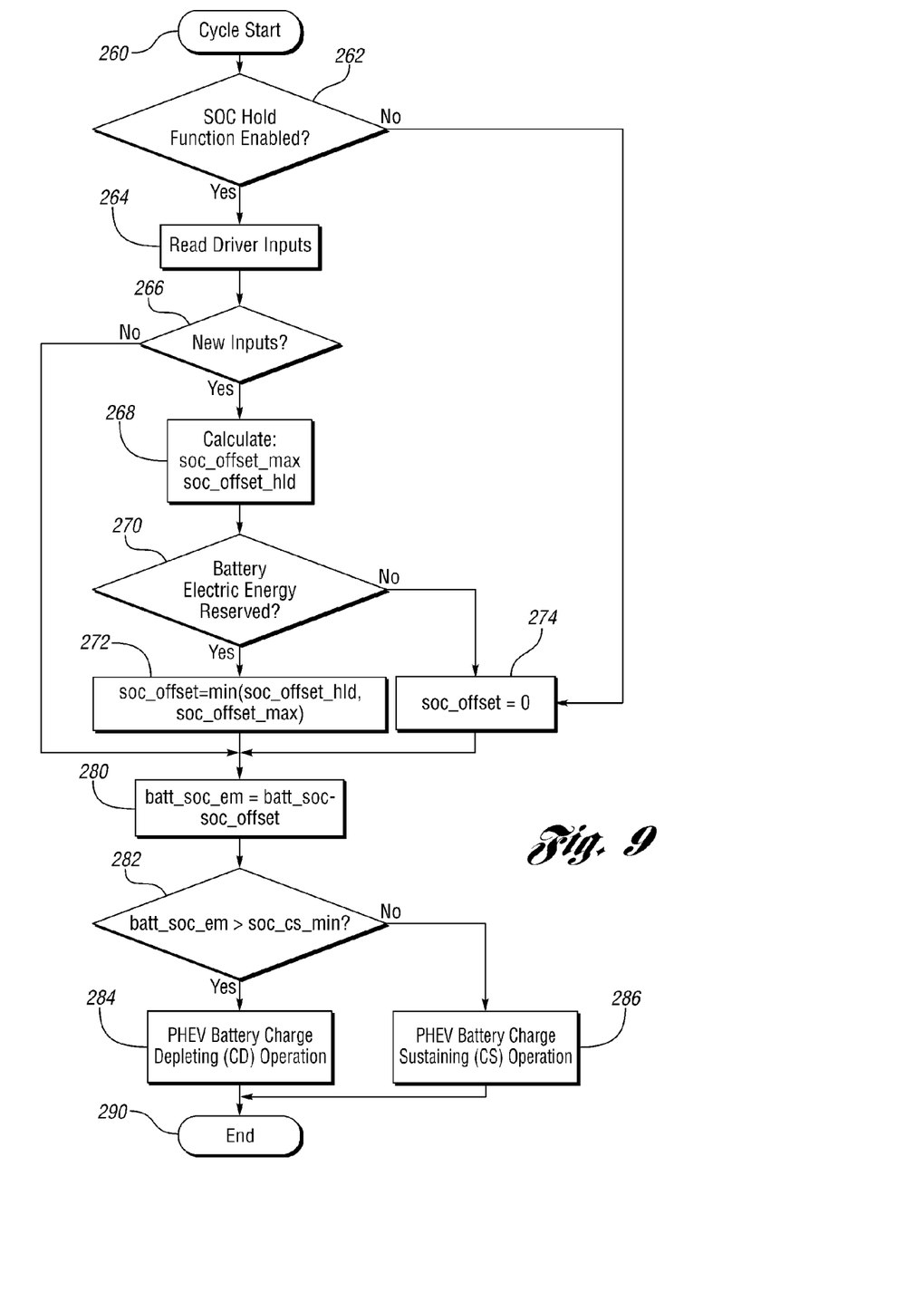
FIG. 9 is a flowchart of the control strategy of the invention when a HEV mode switch is not included in the strategy.

In more detail, in FIG. 9, processing starts at block 260. At block 262, flow proceeds to block 264 when the SOC Hold function is enabled, otherwise, flow proceeds to block 274. At block 264, driver inputs are read. At block 266, a check for new inputs is made. If there are new inputs, soc_offset_max, and soc_offset_hld are calculated at block 268. At block 270, if there is a battery electric energy reservation, flow proceeds to block 272 and soc_offset is calculated. If there is not a battery electric energy reservation or the SOC Hold function is disabled (from block 262), soc_offset is set to 0 at block 274.

At block 280, batt_soc_em is set. By making the Energy Management use this modified value instead of the normal batt_soc, it will achieve the intended effects of the drivers input. At block 282, batt_soc_em is compared to soc_cs_min. When batt_soc_em is greater than soc_cs_min, PHEV battery charge depleting operation takes place (CD mode) at block 284. When batt_soc_em is not greater than soc_cs_min, PHEV battery charge sustaining operation takes place (CS mode) at block 286. Flow ends at block 290.

Figure 10:
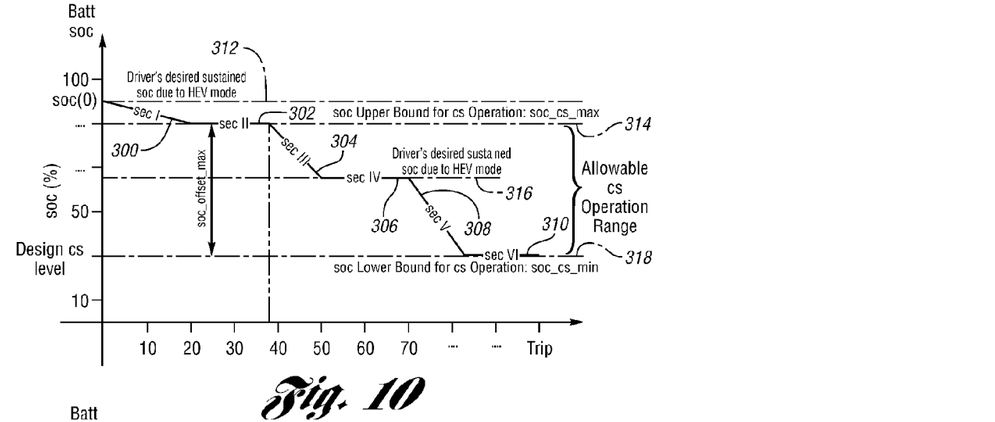
FIG. 10 is a plot of a first example of a PHEV energy management and charge depletion process.
Figure 11:
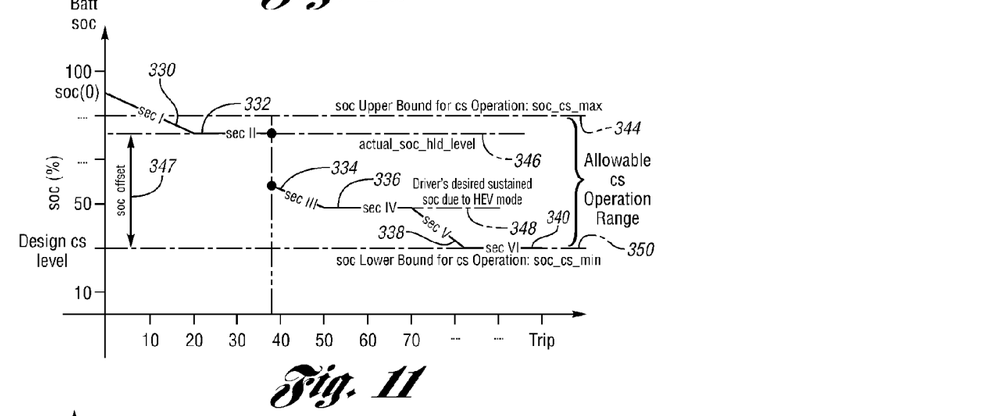
FIG. 11 is a plot of a second example of a PHEV energy management and charge depletion process.
Figure 12:
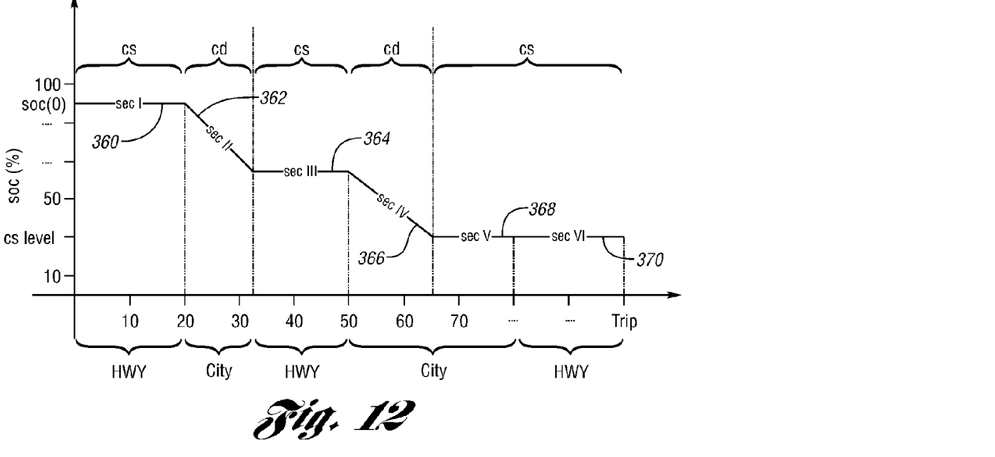
FIG. 12 is a plot of an example of a city-friendly PHEV battery charge use strategy.

FIGS. 10 and 11 show two detailed PHEV flexible battery charge and management use cases. FIG. 12 shows as an example of how this technology can be used for City-Friendly PHEV energy management.

In FIG. 10, the driver initially sets the operating mode preference to HEV mode. This is indicated by a desired sustained SOC level (312). However, as shown in Section I (300) of the battery depletion trajectory the PHEV will not start Charge Sustaining (CS) mode until the battery SOC, batt_soc, has been depleted to the maximum allowable battery charge sustaining SOC level, soc_cs_max (314), which happens at the end of that section. After batt_soc reaches soc_cs_max, CS mode starts as shown in Section II (302) and the battery electric energy is conserved. At the beginning of Section III (304), the driver switches the PHEV operating mode preference to EV. After that, the PHEV is operated mostly relying on the battery electric energy until the driver switches to HEV mode again at the beginning of Section IV (306). This is indicated by a desired sustained SOC level (316). After Section IV (306), the driver cancels the preferred mode by setting the operating mode preference to automatic, and the PHEV resumes EV (CD) operation again in Section V (308) until the battery is fully depleted to the designed battery charge sustaining level, soc_cs_min, at 318. In the final Section (310), the PHEV will only be operated at CS mode, and the EV/HEV switch is automatically set to auto and cannot further be changed.

FIG. 11 shows a case where the energy reservation function is initially enabled by the driver. In the Figure the reserved amount of energy is represented with the level actual_soc_hld_level at 346, which equals soc_cs_min (350)+soc_offset (347), which is based on the driver's desired energy reservation through Equation (4) and (5b).

Note that this level is below soc_cs_max at 344, and that Equation 4 will limit all desired reservations to be below soc_cs_max. The PHEV will keep operating in the default CD mode until the battery SOC state is depleted to the actual_soc_hld_level level at the end of Section I (330). After that, the PHEV will be running in CS mode until the end of Section II (332). Between Section II (332) and Section III (334), the reserved battery electric energy is used for other utility or entertainment functions, and the SOC hold is released (and soc_offset is changed to 0). When the PHEV resumes its trip, the battery SOC level has dropped to a new level, as shown at the beginning of Section III (334). The PHEV starts running in CD mode in Section III (334) until the driver switches the vehicle preferred operating mode from auto to HEV in the beginning of Section IV (336). This is indicated by a desired sustained SOC level (348). The current battery SOC state is sustained during Section IV (336), but the vehicle resumes depletion mode in Section V (338) when the driver switches the preferred operating mode to EV. The EV mode continues until the battery is fully depleted to the soc_cs_min level (350) at which time the PHEV automatically switches to CS, Section VI (340).

In FIG. 12, an example use case of the so called City-Friendly PHEV energy management is depicted to show how a driver can plan his/her PHEV usage such that the vehicle is used friendly to environmental and regulation requirements while achieving its fuel economy optimization goal. In this trace, the battery energy is conserved during highway driving in Section I (360), and the PHEV is therefore able to operate in EV only mode once the vehicle enters urban areas in Section II (362). In Section III (364), the vehicle operates in CS mode. In the second urban area, the PHEV will keep operating in EV mode (Section IV, 366) until the battery is fully depleted and the PHEV changes to CS mode (Section V (368), and onwards; Section VI (370)).

The control method of the invention gives the driver the ability to switch the PHEV operation mode given allowable battery SOC states. With this control function, the driver has the option to bias the vehicle toward EV and HEV operation based on his/her preference and trip schedule. By doing this, the vehicle's emission and noise can be regulated with respect to driving environment. City-friendly operation is possible for example, and the driver also has the ability to reserve portions of the PHEV battery capacity to save electric energy for utility and entertainment purposes. This largely extends the function of the PHEV, and it will add value to the PHEV usage.

In summary, the invention includes:

1. a method that enables driver-preferred battery charge sustaining operation (HEV mode) within an allowable range of battery charge;

2. a method to calculate the battery SOC offset value according to the drivers' desired electric energy reservation level and to the driver's operation mode request;

3. a method to switch between HEV/EV operation mode for the PHEV operation; and 4. a method to reserve parts of the PHEV's battery electric energy for utility and entertainment usage other than vehicle propulsion.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A method of controlling a plugin hybrid electric vehicle including an internal combustion engine, a battery, and an electric machine, the vehicle being operable in a primary electric vehicle driving mode (EV mode) and in a hybrid electric vehicle driving mode (HEV mode), the method comprising:
   receiving driving mode input from the driver selecting the EV mode or the HEV mode;
   receiving energy reservation input from the driver specifying a desired energy reservation;
   in response to the HEV mode being selected, establishing a state of charge (SOC) offset as the lesser of a maximum SOC offset and an allowable SOC offset;
   in response to the EV mode being selected, establishing the SOC offset based on the desired energy reservation; and
   operating the vehicle based on the SOC offset.

2. The method of claim 1 wherein the desired energy reservation is an absolute energy amount.

3. The method of claim 1 wherein the desired energy reservation is a relative SOC level with respect to a minimum charge sustaining SOC.

4. The method of claim 1 wherein the allowable SOC offset is based on a minimum charge sustaining SOC and a present SOC when the driver requests HEV mode.

5. The method of claim 1 wherein establishing the SOC offset based on the desired energy reservation is further based on a minimum charge sustaining SOC and a present SOC.

6. The method of claim 1 wherein operating the vehicle based on the SOC offset further comprises:
   determining an energy management battery SOC as a present SOC less the SOC offset; and
   operating the vehicle based on the energy management battery SOC.

7. The method of claim 6 wherein operating the vehicle based on the energy management battery SOC further comprises:
   operating the vehicle in battery charge depletion mode when the energy management battery SOC is greater than a minimum charge sustaining SOC.

8. The method claim 6 wherein operating the vehicle based on the energy management battery SOC further comprises:
   operating the vehicle in battery charge sustaining mode when the energy management battery SOC is not greater than a minimum charge sustaining SOC.

9. A plugin hybrid electric vehicle including an internal combustion engine, a battery, and an electric machine, the vehicle being operable in a primary electric vehicle driving mode (EV mode) and in a hybrid electric vehicle driving mode (HEV mode), the vehicle further comprising a controller programmed to:
   receive driving mode input from the driver selecting the EV mode or the HEV mode;
   receive energy reservation input from the driver specifying a desired energy reservation;
   in response to the HEV mode being selected, then establish a state of charge (SOC) offset as the lesser of a maximum SOC offset and an allowable SOC offset;
   in response to the EV mode being selected, establish the SOC offset based on the desired energy reservation; and
   operate the vehicle based on the SOC offset.

10. The vehicle of claim 9 wherein the desired energy reservation is an absolute energy amount.

11. The vehicle of claim 9 wherein the desired energy reservation is a relative SOC level with respect to a minimum charge sustaining SOC.

12. The vehicle of claim 9 wherein the allowable SOC offset is based on a minimum charge sustaining SOC and a present SOC when the driver requests HEV mode.

13. The vehicle of claim 9 wherein establishing the SOC offset based on the desired energy reservation is further based on a minimum charge sustaining SOC and a present SOC.

14. The vehicle of claim 9 wherein operating the vehicle based on the SOC offset further comprises:
   determining an energy management battery SOC as a present SOC less the SOC offset; and
   operating the vehicle based on the energy management battery SOC.

15. The vehicle of claim 14 wherein operating the vehicle based on the energy management battery SOC further comprises:
   operating the vehicle in battery charge depletion mode when the energy management battery SOC is greater than a minimum charge sustaining SOC.

16. The vehicle of claim 14 wherein operating the vehicle based on the energy management battery SOC further comprises:
   operating the vehicle in battery charge sustaining mode when the energy management battery SOC is not greater than a minimum charge sustaining SOC.

17. A hybrid electric vehicle operable in an electric mode and in a hybrid mode, comprising a controller programmed to:
   receive driving mode input selecting the electric mode or the hybrid mode;
   receive energy reservation input specifying a desired energy reservation; and
   operate the vehicle based on an SOC offset, wherein, when the operating mode is selected as the hybrid mode, the SOC offset is the smaller of a maximum SOC offset and an allowable SOC offset, otherwise, the SOC offset is based on the specified energy reservation.

18. The vehicle of claim 17 wherein operating the vehicle based on the SOC offset further comprises:
   determining an energy management battery SOC as a present SOC less the SOC offset; and
   operating the vehicle based on the energy management battery SOC.

* * * * *